T. L. STROUD.
FOOD CHOPPER.
APPLICATION FILED JULY 13, 1916.

1,238,358.

Patented Aug. 28, 1917.

Witnesses

Inventor
Thomas L. Stroud

UNITED STATES PATENT OFFICE.

THOMAS L. STROUD, OF FORT MYER, VIRGINIA, ASSIGNOR TO J. L. McLUCAS, OF TENNALLYTOWN, WASHINGTON, DISTRICT OF COLUMBIA.

FOOD-CHOPPER.

1,238,358.      Specification of Letters Patent.      Patented Aug. 28, 1917.

Substitute for abandoned application Serial No. 816,389, filed February 3, 1914. This application filed July 13, 1916. Serial No. 109,160½.

*To all whom it may concern:*

Be it known that I, THOMAS L. STROUD, a citizen of the United States, residing at Fort Myer, in the county of Alexandria and State of Virginia, have invented certain new and useful Improvements in Food-Choppers, of which the following is a specification.

This invention relates to food choppers.

The object of the invention is to produce a food chopper that works in conjunction with a pottery bowl or similar receptacle and has means for supporting the chopper upon the bowl and guiding the knives within the bowl, and at the same time limiting the downward movement of the knives so that they will not injure the bottom of the receptacle, or the knife edges.

Another object is to produce a food chopper that has decided sanitary advantages.

The novel features and details of construction of my invention will be understood from the description and claims, reference being had to the accompanying drawings forming a part of this specification.

In the drawings:—

Like characters of reference designate corresponding parts in the several figures of the drawing.

Figure 1:
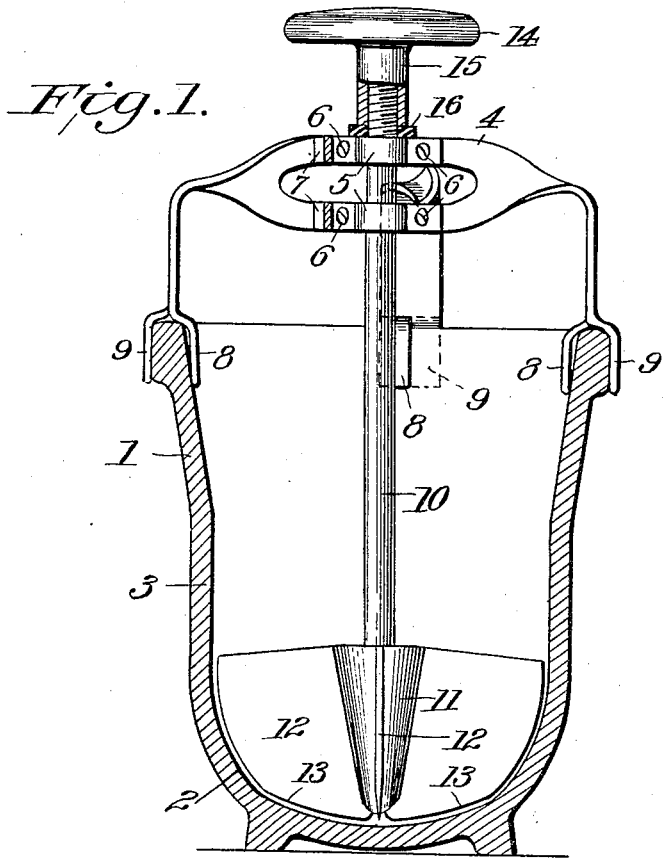
Figure 1 is a vertical section of my invention.
Figure 2:
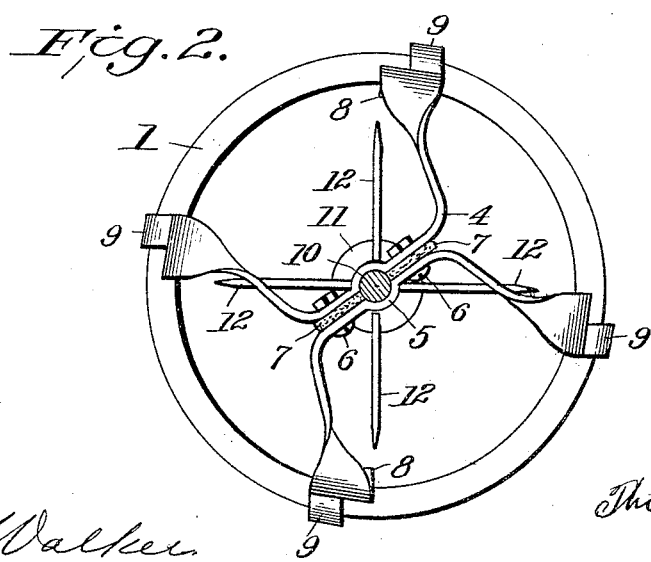
Fig. 2 is a plan view with the handle omitted.

The numeral 1 designates a bowl with a circular bottom 2 and partially vertical sides as at 3.

Resting upon the rim of the bowl is a spider 4 composed of two pieces of metal formed into semicircles at center to provide bearings 5 when joined together by bolts 6. The two members of the spider are spaced apart by strips of leather 7 or similar material to permit of a slight adjustment of the bearings. The arms of the spider have depending portions, which are bifurcated and bent in opposite directions, forming fingers 8 and 9 which straddle the rim of the bowl and positively hold the spider in position.

Mounted to reciprocate in the bearing 5 is a spindle 10 having a conical shaped head 11 upon the lower end. To the head 11 is secured a plurality of knife blades 12, the edges of the blades being shaped to conform to the inner surface of the bottom of the bowl, as indicated at 13. Various shapes may be employed in forming the knives and the bottom of the bowl.

Upon the upper end of the spindle 10 is an adjustable knob 14 having a shank 15. Interposed between the shank 15 and the bearing 5 is a fiber washer 16 to take the jar off the metal. By the use of washers of different thicknesses, a nice adjustment of the knife-edges with respect to the bottom of the bowl is obtained in addition to that produced by adjusting the knob or handle.

The spindle 10 and its fixed parts are comparatively heavy to assist in the cutting operation.

By reference to Fig. 1 of the drawings, it will be seen that the knives are so shaped with relation to the inside of the bowl as to thoroughly cut all material contained therein and this holds true not only with respect to the bottom of the bowl but on the sides as well.

The shape of the spider is such that easy access may be had to the interior of the bowl, and when removed from the bowl the spider provides guards for the knives.

It will be observed that the knives and bowl may be readily cleaned by revolving the knives in the bowl partially filled with water.

What I claim is:—

1. In a food chopper, a reciprocating spindle provided with a conical shaped head, knives attached to said head, means for supporting and guiding said spindle and knives in a bowl, and an adjustable handle attached to the upper end of said spindle and adapted to engage said supporting and guiding means for limiting the downward movement of the spindle.

2. In a food chopper, a reciprocating spindle provided with knives, a guide for said spindle composed of two members adjustably connected together, means for holding the guide in place upon a bowl, and means for limiting the movement of the knives with respect to the bottom of the bowl.

3. In a food chopper, a support provided with a bearing for a reciprocating spindle, fingers attached to the support for engagement with the rim of a bowl, knives connected by the spindle at the lower end thereof, an adjustable knob attached to the upper end of the spindle for limiting the movement of the knives with respect to the bottom of the bowl, and a soft washer intermediate the knob and the bearing.

4. In a food chopper, a reciprocating spindle provided with a head, knives attached to said head, an adjustable handle attached to the upper end of said spindle, and a guide for said spindle adapted to be engaged by said handle to limit the downward movement of the spindle, said guide forming a guard for the knives when the chopper is removed from the bowl.

In testimony whereof I affix my signature.

THOMAS L. STROUD.

Copies of this patent may be obtained for five cents each, by addressing the "Commissioner of Patents, Washington, D. C."